United States Patent
Sonnek

(10) Patent No.: US 11,549,751 B2
(45) Date of Patent: Jan. 10, 2023

(54) SYRUP FLASH

(71) Applicant: IntegroEnergy Group, Inc., Utica, SD (US)

(72) Inventor: Daniel W. Sonnek, Lake Crystal, MN (US)

(73) Assignee: IntegroEnergy Group Inc., Utica, SD (US)

( * ) Notice: Subject to any disclaimer, the term of this patent is extended or adjusted under 35 U.S.C. 154(b) by 416 days.

(21) Appl. No.: 16/749,155

(22) Filed: Jan. 22, 2020

(65) Prior Publication Data

US 2020/0232705 A1 Jul. 23, 2020

Related U.S. Application Data

(60) Provisional application No. 62/795,851, filed on Jan. 23, 2019.

(51) Int. Cl.
| | |
|---|---|
| F26B 23/10 | (2006.01) |
| F28G 9/00 | (2006.01) |
| B01D 3/06 | (2006.01) |
| F28G 15/00 | (2006.01) |
| F26B 23/00 | (2006.01) |

(52) U.S. Cl.
CPC ............. *F26B 23/10* (2013.01); *B01D 3/06* (2013.01); *F26B 23/001* (2013.01); *F28G 9/00* (2013.01); *F28G 15/003* (2013.01)

(58) Field of Classification Search
CPC .......... B01D 3/06; F26B 23/001; F26B 23/10; F28G 9/00; F28G 15/003
See application file for complete search history.

(56) References Cited

U.S. PATENT DOCUMENTS

| | | | |
|---|---|---|---|
| 4,340,446 A * | 7/1982 | Crawford | B01D 3/001 203/DIG. 13 |
| 5,389,209 A * | 2/1995 | Paquette | B01D 3/06 159/901 |
| 5,890,531 A * | 4/1999 | Gairns | F28G 9/00 165/95 |
| 9,989,310 B2 | 6/2018 | Knight, Jr. et al. | |
| 10,345,043 B2 | 7/2019 | Knight, Jr. et al. | |
| 2008/0213849 A1* | 9/2008 | Stewart | C12P 7/12 568/840 |
| 2009/0171129 A1* | 7/2009 | Evanko | C12P 7/04 568/916 |

FOREIGN PATENT DOCUMENTS

CN 204767504 U * 11/2015

* cited by examiner

*Primary Examiner* — Eric S Ruppert
*Assistant Examiner* — Hans R Weiland
(74) *Attorney, Agent, or Firm* — Fox Rothschild LLP

(57) ABSTRACT

A process for augmenting energy in a dryer used in processing is disclosed. The process includes providing a source of syrup having concentrated solids. They syrup is then directed through a syrup line to a recirculation pump where it is recirculated to a heat exchanger having a source of heat delivered thereto. The syrup is heated to a temperature above a flash point of the syrup. The heated syrup is delivered to a flash tank and water vapor is flashed off and then directed through a vent and into a dryer. Cooled syrup remaining in the flash tank is delivered through a cooled liquid line to the syrup line to repeat the process. The delivery of water vapor to the dryer results in an additional source of energy being transferred to the dryer.

5 Claims, 1 Drawing Sheet

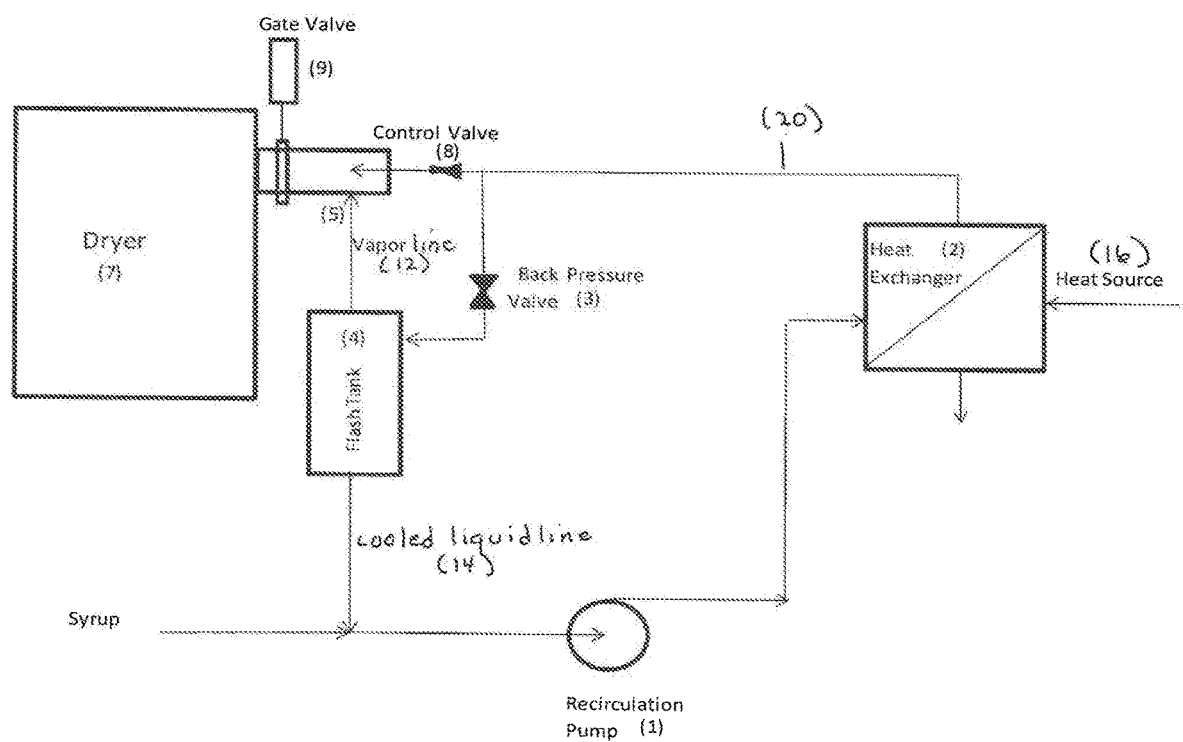

SYRUP FLASH

RELATED APPLICATIONS

This application claims the benefit of priority to U.S. Provisional Appln. Ser. No. 62/795,851 the entirety of which is hereby incorporated by reference.

FIELD OF THE INVENTION

The present invention is generally directed to the augmentation of energy in processing to allow for additional throughput and better material handling.

BACKGROUND OF THE INVENTION

Many industries, such as wet milling facilities, sugar processing, refineries, ethanol production facilities, will employ evaporators to clean and recover process water, which has become laden with dissolved solids that have leached from the process. Example of such processes include but are not limited to front end hydration, slurry, cook systems and the like. By evaporating the water portion, a relatively clean water stream can be recovered to reuse in the process. However, when the clean water is flashed from the process water, the remaining solids are concentrated and must be handled further. This concentrated stream is often termed syrup. The syrup is often mixed with a wet solids stream prior to being injected into a dryer. The solids in the syrup are combined with the wet solids and recovered for use or sale. While this is a common and reasonable handling of the syrup, it can put an extremely high load on the energy requirements and subsequent throughput of the dryer.

BRIEF SUMMARY OF THE INVENTION

The inventors have developed a technology that heats and flashes a portion of the syrup prior to passing it through the dryer. A recirculation pump forces the liquid through a heat exchanger that raises the syrup temperature well above the flash point. Back pressure is maintained on the heat exchanger with the use of a valve positioned just prior to a flash tank. As the heated syrup expands through the backpressure valve, water vapor will flash off and cool the syrup to the temperature dictated by the dryer pressure. The vapors are forced through a vent and are directed into the dryer. This allows additional energy to be transferred to the dryer as well as combining with the dryer exhaust for proper emissions treatment if required. The cooled liquid that remains in the flash tank is combined with fresh syrup and routed through the recirculation pump and the cycle is continued. Because the flashing of vapor will continually increase the solids level (thickening) of the syrup, a portion of the syrup is injected into the vent line via a control valve to combine with the vapors entering the dryer. This liquid is at a relatively high pressure and temperature that creates atomization from the flashing of the liquid and pressure drop.

The recirculation allows the flows to be optimized in the piping and heat exchanger to maximize velocities and subsequent scrubbing. However, with many syrups, fouling is likely to eventually occur. This system is designed to be taken offline for short periods of time to clean in place also referred to as "CIP." The CIP can be done by stopping the syrup flow into the system, emptying the flash tank forward, and flushing with water. At this point, a gate valve can be closed on the vent line to isolate the system from the dryer. A CIP solution can then be pumped into the system via the syrup line and the recirculation pump can be turned on. The flow can be maximized in the pipe and heat exchanger to allow for maximum cleaning. Temperature of the CIP solution can also be controlled with the same heat source. The flow through the control valve will be blocked by the gate valve and be prevented from entering the dryer. This portion of the CIP solution will go backward through the vapor line and down into the flash tank.

BRIEF DESCRIPTION OF THE DRAWINGS

For a better understanding of the invention, and to show how the same may be carried into effect, reference will now be made, by way of example, to the accompanying drawings, in which:

FIG. 1 is a process flow diagram that depicts the system and method in accordance with the invention.

DETAILED DESCRIPTION OF THE INVENTION

Referring to FIG. 1, a recirculation pump (1) and heat exchanger (2) are shown. The recirculation pump forces the process liquid or "syrup" (10) through a heat exchanger (2) that raises the syrup (10) temperature well above the flash point. The flash point can vary depending on the pressure of the dryer (7). In a vacuum the flash point is below 212° F. In higher pressure systems the flash point can be well in excess of 212° F. Back pressure is maintained on the heat exchanger (2) with the use of a backpressure valve (3) positioned upstream of a flash tank (4). The pressure must be high enough to prevent flashing in the heat exchanger (2), which again is dependent on the temperature required by the dryer (7). As the heated syrup (10) expands through the backpressure valve (3), water vapor will flash off and cool the syrup to the temperature dictated by the dryer pressure. The vapors are forced through a vent (5) and are directed into the dryer (7). This provides an additional source of energy that is transferred to the dryer to dry the syrup as well as combining with the dryer exhaust for proper emissions treatment if required. Energy that is normally used to dry the syrup comes from the dryer burner/heat source. The process in accordance with the invention uses an external heat source such as hot water, by way of example, to preheat the syrup to flash a portion external to the dryer. The liquid is cooled to saturation temperature dictated by the dryer pressure. The cooled liquid that remains in the flash tank (4) is directed through a cooled liquid line (14) and combined with fresh syrup (10) and routed through the recirculation pump (1) and the cycle is repeated. Because the flashing of vapor will continually increase the solids level (thickening) of the syrup, a portion of the syrup is injected into the vent line (20) via a control valve (8) to combine with the vapors entering the dryer (7). This liquid is at the operation temperature and pressure of the heat exchanger (2) and creates atomization from the flashing of the liquid and a pressure drop to the pressure of the dryer (2).

The recirculation allows the flows to be optimized in the piping and heat exchanger (2) to maximize velocities and subsequent scrubbing. However, with many syrups, fouling is likely to eventually occur. This system is designed to be taken offline for short periods of time to clean in place or CIP. The CIP can be done by stopping the syrup flow into the system, emptying the flash tank forward, and flushing with water. At this point, a gate valve (9) can be closed on the vent line to isolate the system from the dryer (7). A CIP solution can then be pumped into the system via the syrup line and the recirculation pump can be turned on. The flow can be maximized in the pipe and heat exchanger (2) to allow for maximum cleaning. The temperature of the CIP solution, which is selected by the operator for optimum cleaning, can also be controlled with the same heat source (16). The flow through the control valve will be blocked by a gate valve (9) and be prevented from entering the dryer (7). This portion of the CIP solution will go backward through the vapor line (20) (12) and down into the flash tank (4).

While certain aspects of the present invention have been described, it should be understood that various changes, adaptations and modifications may be made without departing from the spirit of the invention and the scope of the appended claims.

I claim:

1. A process for augmenting energy in a dryer used in processing comprising:
    providing a source of syrup including concentrated solids;
    routing the syrup through a syrup line to a recirculation pump;
    recirculating the syrup to a heat exchanger having a source of heat delivered thereto;
    heating the syrup to a temperature above a flash point of the syrup;
    providing a flash tank operably coupled to the heat exchanger by a back pressure valve;
    routing a first portion of the heated syrup through the backpressure valve to cause expansion of the first portion of the heated syrup in a flash tank;
    flashing off of water vapor in the flash tank and routing the water vapor through a vent and into the dryer;
    routing cooled syrup that remains in the flash tank through a cooled liquid line to the syrup line to repeat the process; and
    providing an additional source of energy to the dryer by the water vapor.

2. The process of claim 1 further comprising: providing a control valve through which a second portion of the heated syrup is routed into the dryer; and combining the second portion of the heated syrup with the water vapor entering the dryer.

3. The process of claim 1, further comprising: providing a cleaning solution to clean a system associated with the process in place including stopping the syrup flow into the system; and emptying the flash tank and flushing the system with water.

4. The process of claim 3, further comprising: providing a gate valve on a vent line; closing the gate valve during the cleaning of the system; and blocking a flow of a second portion of the heated syrup from the heat exchanger to the dryer.

5. The process of claim 3, further comprising: controlling a temperature of the cleaning solution by the source of heat.

* * * * *